United States Patent [19]
Beakes et al.

[11] Patent Number: 5,742,997
[45] Date of Patent: Apr. 28, 1998

[54] STATOR MANUFACTURING METHOD

[75] Inventors: John M. Beakes, Fairborn; Lawrence E. Newman, Tipp City, both of Ohio

[73] Assignee: Globe Products Inc., Huber Heights, Ohio

[21] Appl. No.: 802,525

[22] Filed: Feb. 20, 1997

Related U.S. Application Data

[60] Continuation of Ser. No. 473,084, Jun. 7, 1995, abandoned, which is a division of Ser. No. 219,847, Mar. 30, 1994, Pat. No. 5,495,659.

[51] Int. Cl.$^6$ .................................................. H02K 15/085
[52] U.S. Cl. ............................ 29/596; 29/736; 242/433
[58] Field of Search .......................... 29/596, 597, 564.1, 29/564.6, 564.8, 732, 736; 242/433, 433.1, 433.2

[56] References Cited

U.S. PATENT DOCUMENTS

| | | |
|---|---|---|
| Re. 34,817 | 1/1995 | Luciani . |
| 4,951,379 | 8/1990 | Clemenz ............................ 29/597 |
| 4,982,908 | 1/1991 | Luciani . |
| 4,997,138 | 3/1991 | Luciani . |
| 5,065,503 | 11/1991 | Luciani et al. ...................... 29/735 |
| 5,186,405 | 2/1993 | Beakes et al. ...................... 242/1.1 |
| 5,193,755 | 3/1993 | Lucinai . |
| 5,341,997 | 8/1994 | Luciani . |

OTHER PUBLICATIONS

Accompanying Information Disclosure Statement discussion of admitted prior art.

Accompanying Information Disclosure statement discussion of prior sale.

*Primary Examiner*—Carl E. Hall
*Attorney, Agent, or Firm*—Roger S. Dybvig

[57] ABSTRACT

Pivotal jaws of wire clamps that temporarily grip stator coil lead wires are spring biased to clamp stator coil lead wires thereto when the lead wires are inserted into the clamps at a winding station, and are biased by respective air actuators to ensure release of the lead wires at a coil lead terminating station.

8 Claims, 4 Drawing Sheets

FIG-1

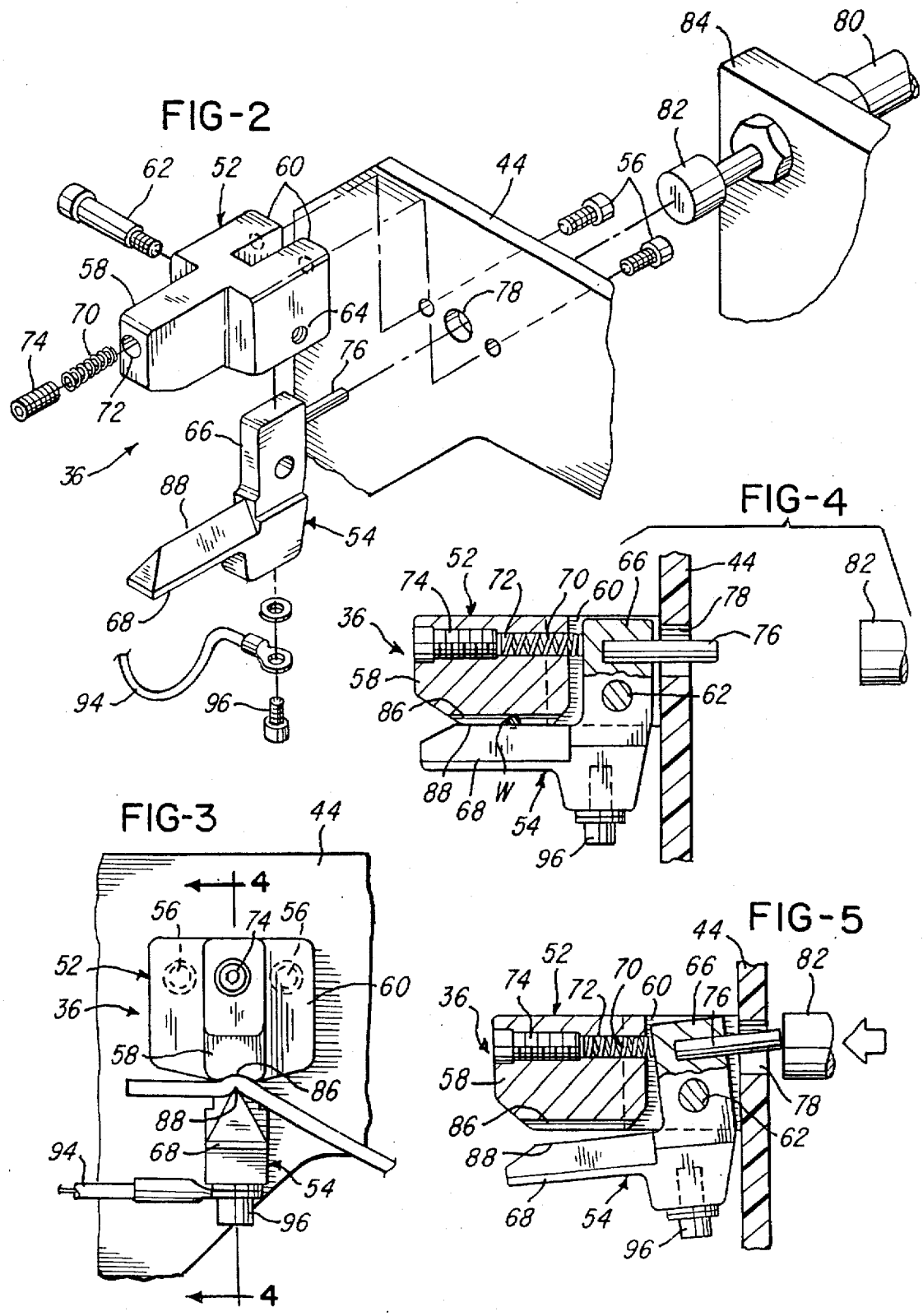

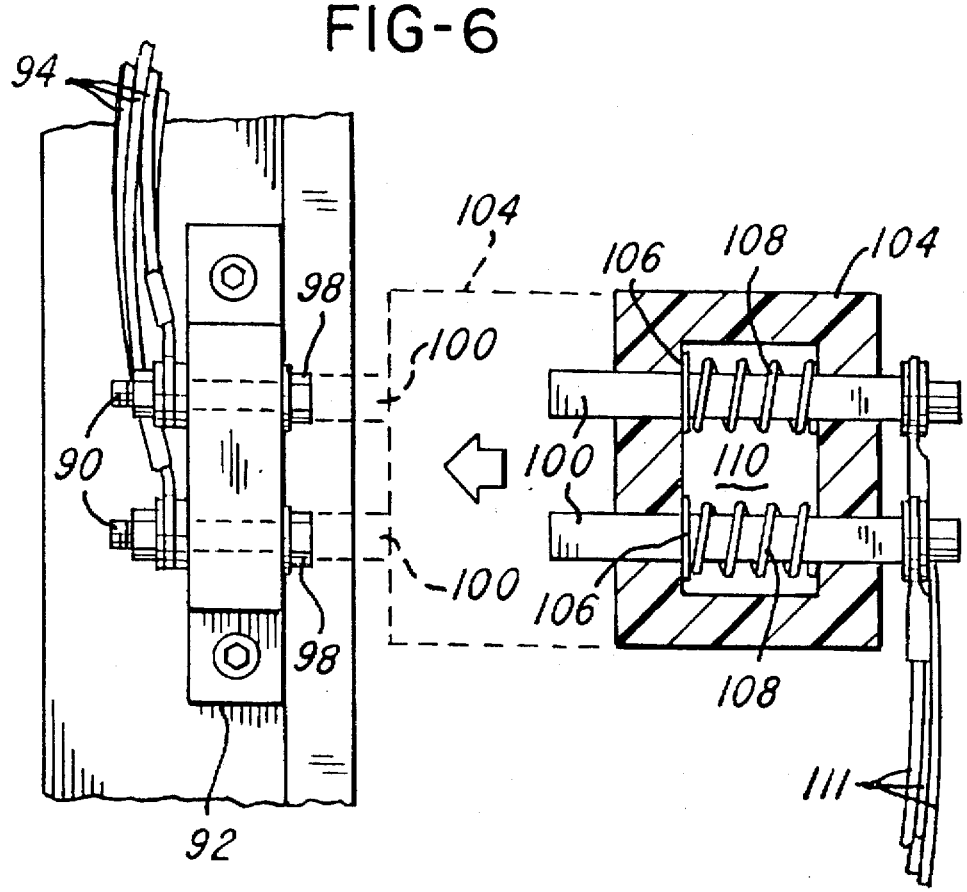

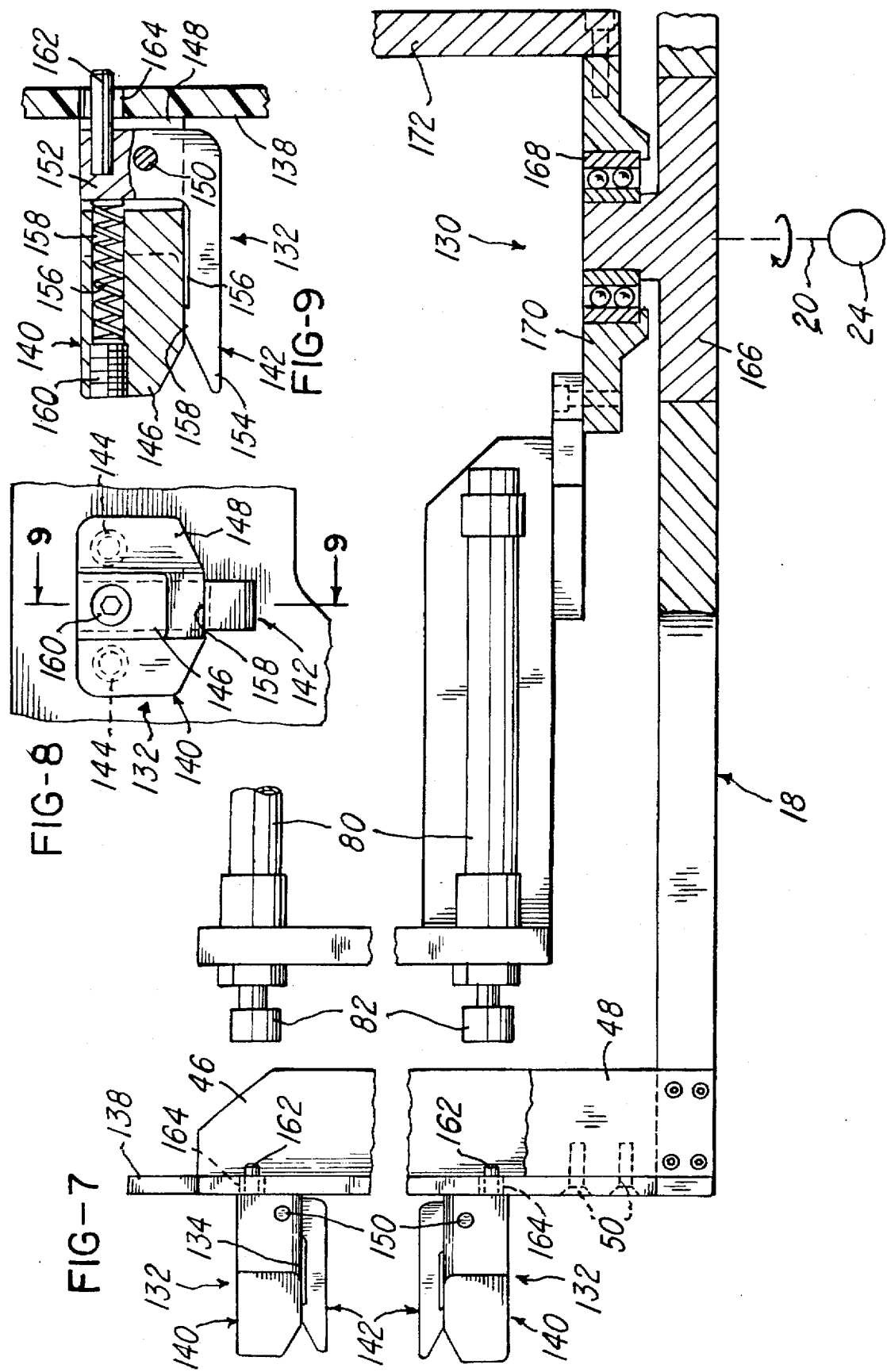

STATOR MANUFACTURING METHOD

CROSS-REFERENCE TO RELATED APPLICATION

This application is a continuation of application Ser. No. 08/473,084, filed Jun. 7, 1995, now abandoned, which is a division of application Ser. No. 08/219,847, filed March 30, 1994, of John M. Beakes and Lawrence E. Newman, now U.S. Pat. No. 5,495,659.

FIELD OF INVENTION

This invention relates to a stator manufacturing method and, although not necessarily so limited, is especially adapted for the manufacture of 2-pole stators for electric motors or other electrical devices.

INCORPORATION BY REFERENCE

The disclosures of Alvin C. Banner et al. U.S. Pat. No. 5,090,108, granted Feb. 28, 1992, and John M. Beakes et al. U.S. Pat. No. 5,186,405, granted Feb. 16, 1993, are hereby incorporated by reference herein.

BACKGROUND OF THE INVENTION

Modern stator manufacturing production lines include several different stations at which different manufacturing operations are performed. One such operation that is frequently accomplished at an early stage in the process for manufacturing a 2-pole stator, is to assemble stator coil terminals or supports therefor on an unwound stator core. Thereafter, the stator coils are wound on the stator core pole pieces at a stator winding station using magnet wire having an electrically insulating coating. A common practice in use at this time is to temporarily clamp the stator coil lead wires to wire clamps during the winding process. At a later manufacturing stage, the lead wires are connected to the terminals mounted on the stator core at a coil lead terminating station.

One type of stator manufacturing machine, known as a turret winder, such as the machine 50 disclosed in above-mentioned Beakes et al. U.S. Pat. No. 5,186,405, includes a turret by which unwound stators having cores on which terminal members have previously been assembled are moved to a stator winding station at which the stator coils are wound and by which the freshly wound stators are then moved to a lead connect station at which the stator coil lead wires are connected to the terminal members on the core. Lead pull assemblies at the winding station have wire grippers which are manipulated to place the stator coil lead wires into temporary wire clamps that are moved to a lead connect station along with the wound stator. Mechanisms at the lead connect station remove the stator coil lead wires and connect them to stator terminals or terminal support members on the stator core. As known to those familiar with the stator winding art, the same general method is practiced using different types of mechanisms for transporting the stator from the winding station to the coil lead terminating station, such as shown in the above mentioned Banner et al. U.S. Pat. No. 5,090,108.

Various temporary wire clamps have been used. A simple wire clamp having jaws that are spring biased toward one another may be sufficient. However, wires temporarily held by a spring operated clamp may occasionally may remain stuck in the clamp and interfere with subsequent manufacturing procedures. Wire clamps that are spring-biased opened and closed by individual air actuators (one for each temporary clamp) have also been used. By using air actuators to close the clamps it was possible to ensure that wires of various different sizes would be securely clamped. However, the air actuators had to be transferred with the clamps and the expense, complexity, and space requirements for the air actuators and their controls made their use undesirable.

SUMMARY OF THE INVENTION

An object of this invention is to provide a stator manufacturing method embodying an improved temporary wire clamp method by which stator coil lead wires can not only be satisfactorily gripped but will also assuredly be released at the coil lead terminating station.

In accordance with this invention, the jaws of the temporary wire clamps are spring-biased closed and opened by air actuators which are permanently located at the coil lead terminating station. Accordingly, the jaws of the temporary wire clamps will be sufficiently spaced apart when opened to assure that the coil lead wires will not remain gripped to them.

Other objects and advantages will become apparent from the following description of the drawings.

BRIEF DESCRIPTION OF THE DRAWINGS

FIG. 1 is a partially diagrammatic, fragmentary, perspective view of portions of a stator manufacturing and testing apparatus embodying the instant invention.

FIG. 2 is an enlarged, partially exploded, fragmentary perspective view of a portion of the apparatus shown in FIG. 1.

FIG. 3 is a fragmentary front elevational view of parts of the apparatus illustrated in FIG. 2 shown engaged with a stator coil lead wire.

FIG. 4 is a fragmentary side elevational view of the parts shown in FIG. 3. Portions of FIG. 4 are shown in vertical cross section along line 4—4 of FIG. 3.

FIG. 5 is a fragmentary cross sectional view similar to FIG. 4 but with parts shown at a stage of operation of the apparatus different from that illustrated by FIG. 4.

FIG. 6 is a fragmentary side elevational view, with parts in cross section, of another portion of the apparatus shown in FIG. 1. FIG. 6 shows the parts as if viewed in the direction of arrows 6—6 of FIG. 1 and along the section indicated thereby.

FIG. 6 further includes a phantom line representation of a moved position of a tester terminal block.

FIG. 7 is a fragmentary, side elevational view, with parts broken away and in cross section of parts of a stator manufacturing machine with wire clamps of a second embodiment in accordance with this invention.

FIG. 8 is an enlarged, fragmentary, front elevational view of a portion of the machine of FIG. 7.

FIG. 9 is a fragmentary side elevational view of the parts shown in FIG. 8, but on a slightly smaller scale. Portions of FIG. 9 are shown in vertical cross section along line 9—9 of FIG. 8.

DETAILED DESCRIPTION

Figure 1:
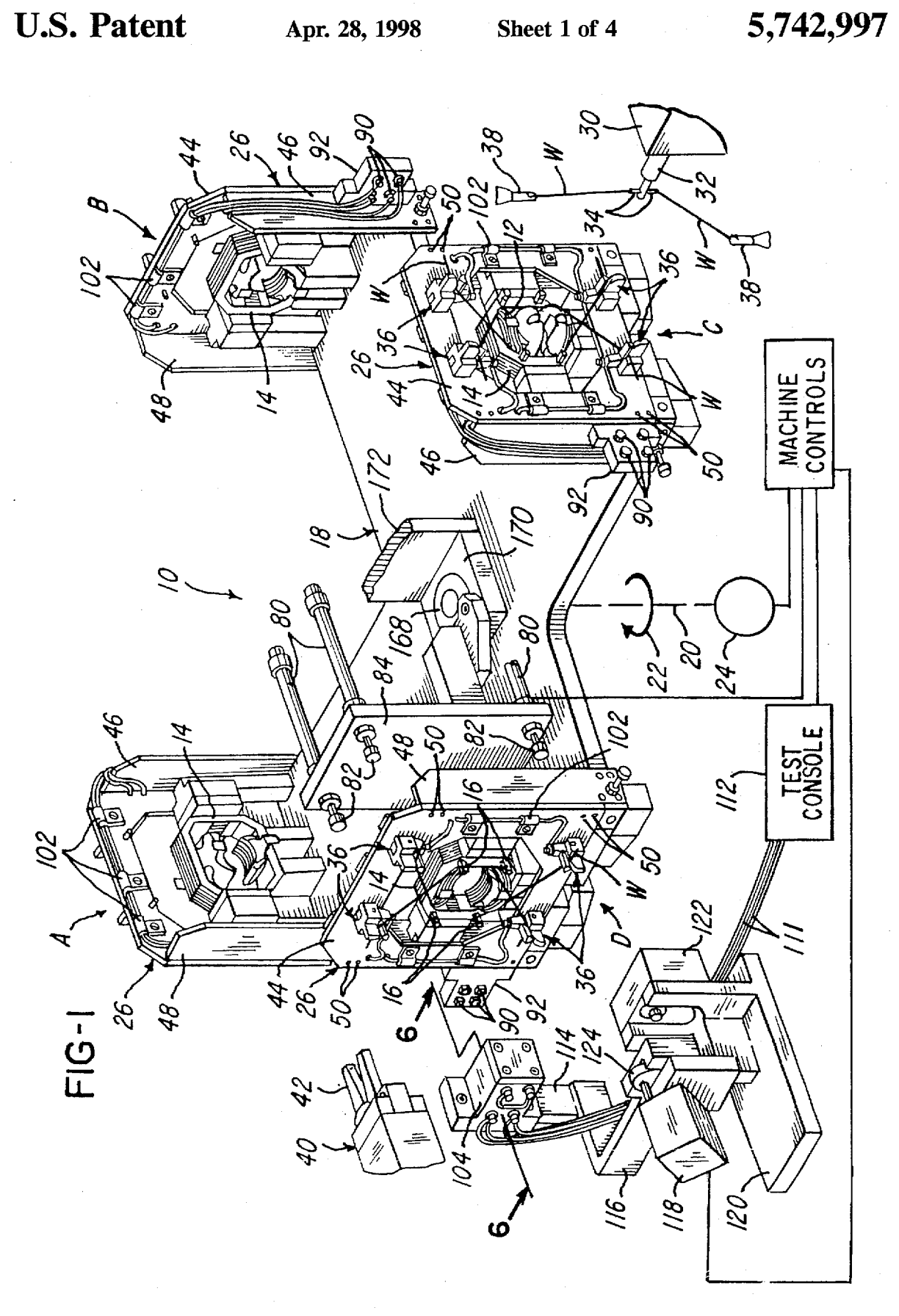

With reference to FIG. 1, this invention is incorporated into a stator manufacturing and testing apparatus, generally designated 10, and is used to wind coils 12 formed from insulated magnet wire onto a 2-pole stator 14, to test the coils 12 and their lead wires W, and to connect the lead wires W to stator terminals or stator terminal supports 16 mounted on the stator cores. All of the operations of the apparatus 10 are synchronized and controlled by suitable machine controls, diagrammatically illustrated in FIG. 1. Such controls are known, may be conventional, and are not further described herein.

Apparatus 10 includes a turret plate 18 mounted for rotation about a vertical axis 20 (in the manner illustrated in FIG. 7) and repeatedly rotationally indexed through successive 90 degree increments in one direction, as indicated by the arrow 22, about its vertical axis 20 by a suitable indexing drive motor 24. Stators to be wound are clamped to an individual one of four stator support and clamp mechanisms, generally designated 26, to which they remain clamped throughout a complete cycle of operation of the apparatus of winding, testing, and lead connecting operations.

The four stator clamp mechanisms 26 are connected to the turret plate 18 at 90 degree spaced locations so that, in operation, after each 90 degree index of the turret plate 18, there will be a clamp mechanism 26 at each of four stations, namely a load/unload station A, an idle station B, a winding station C, and a coil lead terminating station D. At each of the stations, the stators are positioned with their center axes extending horizontally and substantially perpendicularly with respect to the vertical axis 20 of the turret plate 18 and with the end faces of the stators most remote from the vertical axis 20 in vertical orientations and spaced a fixed horizontal distance from the vertical axis 20 of the turret plate 18.

At the load/unload station A, a newly wound stator 14 is unclamped from its support and clamp assembly 26, removed from the turret plate 18, and replaced by an unwound stator 14. No operations are performed on the stator at the idle station B. At the winding station C, a pair of stator coils are wound by the operation of a winding head 30 located adjacent the winding station C that has a reciprocating and oscillating shuttle or ram 32 that draws wires from sources (not shown) of wire under tension and having wire guide needles 34 through which the wires exit as the coils are wound. The winding shuttle or ram 32 reciprocates and oscillates about a fixed horizontal axis in order to wind coils of wire around the stator pole pieces in a manner well known in the art.

At or about the time of the commencement of the winding of a pair of coils 12, the stator lead wires, known as "start wires," are inserted into a pair of temporary wire clamps 36 by the operation of a pair of movable wire grippers 38, which are preferably of the type shown in said U.S. Pat. No. 5,186,405. At the conclusion of the winding operation, the wire portions leading from the coils to the winding shuttle 32 are gripped by the wire grippers 38 to form coil finish lead wires extending from the coils 12, which are then positioned in other ones of the wire clamps 36. Wire cutting mechanisms associated with the wire grippers 38 cut the finish leads free from the wire grippers 38 so that the newly wound stator 14 is completely free from the winding shuttle 32. The wound stator 14 is then indexed by rotation of the turret plate 18 to the wire terminating station D at which the stator is electrically tested and the start and finish leads are removed from the wire clamps 36 and at least temporarily connected to terminals on the stator 14 by a robot 40 having a wire-gripping and manipulating end effector 42. The robot 40 may also be conventional and is not further described herein. Thus it may be seen that, when the newly wound stator returns to the load/unload station A, it may be simply unclamped from the turret plate 18 and removed. The foregoing operations are repeated to continuously wind stators.

At each turret station, the temporary wire clamps 36 are mounted on a clamp mounting plate 44 made from an insulating material, such as a phenolic resin or other plastic material, and which in turn is mounted on the outwardly facing edge surfaces of a mutually-spaced pair of support plates 46 and 48 affixed to the turret plate 18 by screws 50. The support plates 46 may be referred to as the leading plates with reference to the direction of rotation of the turret plate 18 indicated by the arrow 22.

With reference to FIGS. 2 through 5, each temporary wire clamp 36 includes a pair of wire clamp members, namely a fixed clamp member 52 and a movable or pivotal clamp member 54. The pivotal clamp member 54 and, optionally, the fixed clamp member 52, are made from a hardened tool steel or other suitable electrically conductive material. Fixed clamp member 52 is fixedly mounted on the clamp mounting plate 44 by screws 56 and comprises a body member having a horizontal jaw 58 and a bifurcated portion abutting the clamp mounting plate 44 that forms a clevis yoke 60 through which a clevis pin 62 extends. Clevis pin 62, which may simply be a shoulder screw, has a threaded end engaged in a tapped hole 64 in one of the bifurcations of the clevis yoke 60. The pivotal clamp member 54 comprises an L-shaped body member having a generally vertical leg 66 pivotally supported by the clevis pin 62. Pivotal clamp member 54 further includes a generally horizontal, movable clamp jaw 68 that confronts the fixed clamp jaw 58.

A clamp spring 70 is mounted partly within a through bore 72 in the fixed clamp member 52 and has one end which bears against the outwardly facing surface of the vertical leg 66 of the pivotal clamp member 54. The other end of the clamp spring 70 abuts against the inner end of a retaining screw 74 which is located in the tapped, outer end of the through bore 72. Clamp spring 70 is under compression so that it pushes against the vertical leg 66 of the pivotal clamp member 54, which causes the pivotal clamp jaw 68 to be pressed against the fixed jaw 58.

Accordingly, a lead wire W inserted between the fixed jaw 58 and the movable jaw 68 will be securely clamped between the jaws 58 and 68, as is shown in FIG. 4.

With reference to FIGS. 4 and 5, in order to release the clamped wire from a temporary clamp 36, a release pin 76 is fixed in the vertical leg 66 of the pivotal movable clamp member 54 and extends rearwardly completely through and beyond a through bore 78 in the clamp mounting plate 44. An air operated clamp release actuator 80 is energized to extend a fitting 82 at the end of its piston rod into engagement with the rearwardly projecting end of the release pin 76 and thereby overcome the bias of the clamp spring 70 and reversely pivot the pivotal clamp member 54 so that its jaw 68 moves away from the fixed jaw 58 as shown in FIG. 5. For reasons which will become apparent, the piston rod fitting 82 is preferably made from a plastic insulating material or else has an insert (not shown) made of such material that engages the release pin 76 so that there can be no accidental electrical connection between the release pin 76 and the clamp release actuator 80.

As shown in FIG. 1, there are four clamp release actuators 80, one for each temporary clamp 36, mounted on a vertical support plate 84 that is fixed and does not rotate with the turret plate 18. Therefore, the clamp release actuators remain adjacent the testing and lead wire connect station D at all times. Here it may be noted that there are occasions when more than four temporary clamps 36 may be used, particularly for stators having coils with intermediate taps. As is obvious, there would then be more than four clamp release actuators 80.

In the embodiment of this invention shown in FIGS. 1 through 6, the confronting surfaces of the fixed clamp jaw 58 and the movable clamp jaw 68 are contoured not only to firmly grip the lead wire segments W but also to scrape away the insulating coating on the lead wires as they are inserted therein. By scraping away the insulation in this manner, an electrical connection is formed between each lead wire and its associated pivotal clamp member 54. With continued reference to FIGS. 2 through 5, the mutually confronting surfaces of the fixed clamp jaw 58 and the movable clamp jaw 68 are contoured to have beveled outer ends by which the lead wire segments W are guided therebetween as a result of the movements of the lead wire grippers 38. In addition, the fixed clamp jaw 68 has a shallow, longitudinally-extending groove 86 confronting the pivotal jaw 68 and the pivotal jaw 68 has beveled side faces that join at a longitudinally-extending knife edge 88 that confronts the center of the shallow groove 86 in the fixed clamp jaw 58. As a result of this construction, the insulating coating on a lead wire is stripped away by the knife edge 88 as the lead wire is being inserted between the clamp jaws 58 and 68 by operation of the wire grippers 38 into the position illustrated in FIGS. 3 and 4. Here, it may be noted as apparent that the clamp springs 70 must be sufficiently strong to hold the pivotal clamp jaws 54 in position to effect the scraping away of the insulating coating on the lead wires as described above.

As best illustrated in FIGS. 1, 2, 3 and 6, each pivotal clamp jaw 68 is electrically connected to an electrical terminal member 90 mounted on a terminal block 92 which itself is mounted on the associated leading support plate 46. Such electrical connection is provided by means of an insulated connector wire 94 connected at one end to a mounting screw 96 projecting from the pivotal clamp and connected at its other end to the terminal member 90. Terminal member 90 may conveniently comprise a brass screw, the head 98 of which has been faced off flat. Terminal screw head 98 projects out the front side of terminal block 92 so that it can be engaged by a cooperating tester terminal member 100 aligned therewith. Insulated connector wires 94 are clamped to the mounting plate 44 by suitable clips 102 and extend through to the backside of the mounting plate 44 and around the top rear of the mounting plate 44 to their associated clamp terminals 90 on the terminal block 92.

With reference to FIG. 1, there is one tester terminal member 100 aligned with each of the clamp terminal members 90. Tester terminal members 100 are preferably made from square brass rod material and are held within square bores in the front and rear walls of a tester terminal housing 104 so that they cannot rotate. An intermediate portion of each tester terminal member 100 is grooved for connection of a suitable retaining ring 106, such as an e-ring or a c-clip, thereto and is surrounded by a coil spring 108. All of the retaining rings 106 and the coil springs 108 are located within a hollow compartment 110 within the tester terminal housing 104 with the springs 108 placed under compression so that the retaining rings 106 and, accordingly, the tester terminal members 100 are biased toward the clamp terminal members 90. Therefore, the tester terminal housing 104 can be advanced, as will be described below, toward the clamp terminals 90 to the point at which the tester terminal springs 108 are further compressed so that good electrical contact is effected between the clamp terminals 90 and the tester terminals 100. The ends of the tester terminals 100 are connected by connector wires 111 to an electric test console 112 which performs such electrical tests on the coils 12 and their lead wires as are desired. Preferably such tests are carried out automatically and, in the event of a failure, operation of the winding and testing apparatus 10 is interrupted until the problem which caused the test failure can be cured. The nature of the tests and the mechanical and electronic construction of the test console 112 may be conventional and form no part of this invention. Assuming the test results are acceptable, the tester terminal housing 104 is retracted from the turret 18, causing a disconnection of the tester terminals 100 from the clamp terminals 90, and the robot 40 is then energized to effect connection of the coil lead wires to the terminals or terminal supports 16.

The tester terminal housing 104 is mounted on a stanchion 114 projecting upwardly from an L-shaped, tooling support arm 116 which is driven toward and away from the turret plate 18 in order to effect electrical connection and disconnection of the tester terminal members 100 with the clamp terminals 90 by means of a tooling positioning actuator 118, which is preferably a double-acting linear air actuator, mounted on an immovable support member 120. A second air actuator 122 is shown mounted on the immovable support member 120. It can be used to prevent over travel or to reversely position the tooling support arm 116, and is not essential to the operation of the apparatus of this invention.

To reduce the load on the tooling actuator 118, the stanchion 114 and its support arm 116 are preferably made from aluminum or other lightweight metal. To resist damage to the aluminum material, a steel insert (not shown) can be mounted in the support arm 116 aligned with the piston rod of the second air actuator 122 in the event the latter actuator 122 may be used to position the support arm 116. The support arm 116 can be connected by screws (not shown) to a mounting plate 124 connected to the piston and guide rods projecting from the tooling 118. To resist having the support arm 118 twist or sag, it preferably is formed with a channel in which the mounting plate 124 is snugly received.

With reference to FIGS. 7, 8 and 9, a second embodiment of a stator manufacturing machine, generally designated 130, in accordance with this invention is illustrated. Like reference numbers are applied to parts of the machine of FIGS. 7, 8 and 9 which may correspond identically to parts in FIGS. 1 through 6. Machine 130 is the same machine as the machine 10 of FIGS. 1 through 6 except that no provision is made for electrically testing the stator coils at the coil lead terminating station and the wire clamps, generally designated 132 in FIGS. 7, 8 and 9, have conventional confronting wire clamping surfaces 134 and 136 which are not designed to remove the insulating coating from the coil lead wires.

In this second embodiment, the temporary wire clamps 132 are mounted on clamp mounting plates 138, which could be made from aluminum or other suitable material and need not be made from an electrical insulating material, and which are mounted on the outwardly facing edge surfaces of mutually-spaced pairs of support plates 46 and 48 affixed to the turret plate 18. Although only two wire clamps 132 are illustrated in FIG. 7, it is to be understood that, as in the case of the first embodiment, there will be four or more wire clamps supported by each clamp mounting plate 138.

With reference to FIGS. 8 and 9, each temporary wire clamp 132 includes a pair of wire clamp members, namely a fixed clamp member 140 and a movable or pivotal clamp member 142. Fixed clamp member 140, which is fixedly mounted on the clamp mounting plate 138 by screws 144 and comprises a body member having a horizontal jaw 146 and a bifurcated portion abutting the clamp mounting plate 138 that forms a clevis yoke 148 through which a clevis pin 150 extends. The pivotal clamp member 142 comprises an L-shaped body member having a generally vertical leg 152 pivotally supported by the clevis pin 150. Pivotal clamp member 142 further includes a generally horizontal, movable clamp jaw 154 that confronts the fixed clamp jaw 146. Clamp jaw 154 has a relieved clamping surface 156 intermediate its ends so that a tooth 158 is effectively formed at its outer end. The provision of such a tooth is not new and is known to be effective for better retaining lead wires against accidental removal.

A clamp spring 156 is mounted partly within a through bore 158 in the fixed clamp member 140 and has one end which bears against the outwardly facing surface of the vertical leg 152 of the pivotal clamp member 142. The other end of the clamp spring 156 abuts against the inner end of a retaining screw 160 which is located in the tapped, outer end of the through bore 158. Clamp spring 156 is under compression so that it pushes against the vertical leg 152 of the pivotal clamp member 142, which causes the pivotal clamp jaw 154 to be pressed against the fixed jaw 146. Accordingly, a lead wire (not shown) inserted between the fixed jaw 146 and the movable jaw 154 will be securely clamped between the jaws 146 and 154.

With reference to FIGS. 8 and 9, in order to release the clamped wire from a temporary clamp 132, a release pin 162 is fixed in the vertical leg 152 of the pivotal movable clamp member 142 and extends rearwardly completely through and beyond a through bore 164 in the clamp mounting plate 138. As in the first embodiment, an air operated clamp release actuator 80 is energized to extend a fitting 82 at the end of its piston rod into engagement with the rearwardly projecting end of the release pin 162 and thereby overcome the bias of the clamp spring 156 and reversely pivot the pivotal clamp member 142 so that its jaw 154 moves away from the fixed jaw 146 when the lead wire gripped thereby is to released.

As before in the embodiment of FIGS. 1 through 6, there are four clamp release actuators 80, one for each temporary clamp 132. Except that the embodiment of FIGS. 7 through 9 is not capable of performing an electrical test procedure, the operation of the embodiment of FIGS. 7, 8 and 9 is the same as in the embodiment of FIGS. 1 through 6.

In the practice of this invention using a robot 40 with an end effector 42, after a wound stator is transferred to the coil lead terminating station, a first lead wire is gripped by the robot end effector and, by manipulation of the end effector, connected to a terminal device on the stator core. The remaining lead wires are gripped in seriatim by the end effector and connected to their respective terminal devices. Each of the pivotal clamp jaws is pivoted by its associated said air actuator immediately after the associated lead wire is gripped by said end effector to ensure release of the lead wires from the clamps.

Although the presently preferred embodiments of this invention has been described, it will be understood that within the purview of the invention various changes may be made within the scope of the following claims.

I claim:

1. A stator manufacturing method comprising the steps of:

supporting a stator core on a support member at a winding station;

winding coils of insulated magnet wire onto said stator core while inserting coil lead wires extending to and from said coils between a fixed jaw and a movable jaw of respective temporary wire clamps supported in fixed relation to said support member, said pivotal jaws being spring biased to grip said lead wires;

transferring said support member with said stator supported thereon along with said temporary wire clamps from said winding station into a coil lead terminating station;

attaching said lead wires to stator terminals or terminal supports at said coil lead terminating station; and moving said movable clamp jaws away from said fixed clamp jaws by engaging said movable clamp jaws by air actuators located adjacent said coil lead terminating station.

2. The method of claim 1 wherein said attaching step is accomplished by gripping said lead wires seriatim by a robot end effector and manipulating said end effector with the wires gripped thereby, and wherein each of said movable clamp jaws is moved by its associated one of said air actuators immediately after the associated lead wire is gripped by said end effector.

3. The method of claim 1 wherein said stator is supported on a rotatable turret and said transferring step is carried out by rotating said turret.

4. The method of claim 3 wherein said attaching step is accomplished by gripping said lead wires seriatim by a robot end effector and manipulating said end effector with the wires gripped thereby, and wherein each of said movable clamp jaws is moved by its associated one of said air actuators immediately after the associated lead wire is gripped by said end effector.

5. The method of claim 1 wherein said movable clamp jaw is pivotal relative to said fixed clamp jaw, and wherein said moving steps comprises pivoting said pivotal clamp jaw away from said fixed clamp jaw.

6. The method of claim 2 wherein said movable clamp jaw is pivotal relative to said fixed clamp jaw, and wherein said moving steps comprises pivoting said pivotal clamp jaw away from said fixed clamp jaw.

7. The method of claim 3 wherein said movable clamp jaw is pivotal relative to said fixed clamp jaw, and wherein said moving steps comprises pivoting said pivotal clamp jaw away from said fixed clamp jaw.

8. The method of claim 4 wherein said movable clamp jaw is pivotal relative to said fixed clamp jaw, and wherein said moving steps comprises pivoting said pivotal clamp jaw away from said fixed clamp jaw.

* * * * *